US011109714B2

(12) United States Patent
Cox et al.

(10) Patent No.: US 11,109,714 B2
(45) Date of Patent: Sep. 7, 2021

(54) STIRRING TOOL

(71) Applicants: Jamie Cox, Havant (GB); Mark Seidler, Havant (GB)

(72) Inventors: Jamie Cox, Havant (GB); Mark Seidler, Havant (GB)

(73) Assignee: KENWOOD LIMITED

( * ) Notice: Subject to any disclaimer, the term of this patent is extended or adjusted under 35 U.S.C. 154(b) by 248 days.

(21) Appl. No.: 15/776,577

(22) PCT Filed: Nov. 25, 2016

(86) PCT No.: PCT/GB2016/053723
§ 371 (c)(1),
(2) Date: May 16, 2018

(87) PCT Pub. No.: WO2017/089828
PCT Pub. Date: Jun. 1, 2017

(65) Prior Publication Data
US 2018/0344090 A1 Dec. 6, 2018

(30) Foreign Application Priority Data

Nov. 25, 2015 (GB) .................................... 1520828

(51) Int. Cl.
*A47J 36/16* (2006.01)
*A47J 37/06* (2006.01)
(Continued)

(52) U.S. Cl.
CPC ......... *A47J 43/0722* (2013.01); *A47J 43/085* (2013.01)

(58) Field of Classification Search
CPC .... A47J 43/0722; A47J 43/085; A47J 36/165; A47J 43/046; A47J 43/0716
(Continued)

(56) References Cited

U.S. PATENT DOCUMENTS

| 3,603,364 A * | 9/1971 | Samuelian ............ A47J 43/046 241/199.12 |
| 7,993,694 B2 * | 8/2011 | Goderiaux ............ A47J 36/165 426/438 |

(Continued)

FOREIGN PATENT DOCUMENTS

| CN | 102764087 A | 11/2012 |
| CN | 202919898 U | 5/2013 |

(Continued)

OTHER PUBLICATIONS

International Search Report and Written Opinion issued in PCT/GB2016/053723, dated May 10, 2017; ISA/EP.
(Continued)

*Primary Examiner* — Huy Tram Nguyen
(74) *Attorney, Agent, or Firm* — Harness, Dickey & Pierce, P.L.C.

(57) ABSTRACT

A stirring tool for a kitchen appliance such as a food processor has a curved, inclined blade to lift food material from the base of the food processor bowl and turns it over. The tool comprises a shaft adapted to be driven in rotation by a drive outlet of the kitchen appliance, and a blade extending outwardly of the shaft at or adjacent a base thereof, the blade being shaped so as to lift food from a leading edge to a trailing edge thereof upon rotation of the blade, and the leading edge being shaped so as to urge food inwardly towards the shaft.

9 Claims, 16 Drawing Sheets

(51) Int. Cl.
*A47J 43/046* (2006.01)
*A47J 43/07* (2006.01)
*A47J 43/08* (2006.01)

(58) Field of Classification Search
USPC .................................................... 366/309
See application file for complete search history.

(56) References Cited

U.S. PATENT DOCUMENTS

| | | |
|---|---|---|
| 2003/0226923 A1 | 12/2003 | Starr et al. |
| 2006/0169812 A1* | 8/2006 | Galban ............... A47J 43/046 241/282.1 |
| 2011/0185917 A1 | 8/2011 | Goderiaux et al. |
| 2012/0145140 A1 | 6/2012 | Chang |
| 2016/0324368 A1 | 11/2016 | Seidler et al. |

FOREIGN PATENT DOCUMENTS

| | | |
|---|---|---|
| CN | 203417081 U | 2/2014 |
| CN | 104720604 A | 6/2015 |
| EP | 1923128 A2 | 5/2008 |
| EP | 2394549 A2 | 12/2011 |
| EP | 2520205 A1 | 11/2012 |
| FR | 2 997 000 A1 | 4/2014 |
| WO | WO-2016199086 A1 | 12/2016 |
| WO | WO-2016199087 A1 | 12/2016 |

OTHER PUBLICATIONS

GB Search Report of the Intellectual Property Office issued in Application No. GB1520828.3, dated Apr. 13, 2016.

Extended European Search Report for Application No. EP 19213021.9 dated Mar. 19, 2020 (8 pages).

First Office Action regarding Chinese Patent Application No. 201680067057.0 (with English translation) dated Oct. 19, 2020 (11 pages).

* cited by examiner

STIRRING TOOL

CROSS-REFERENCE TO RELATED APPLICATIONS

This application is a 371 U.S. National Stage of International Application No. PCT/GB2016/053723, filed on Nov. 25, 2016, which claims priority to Great Britain Application 1520828.3 filed on Nov. 25, 2015. The entire disclosures of the above applications are incorporated herein by reference.

FIELD

The present invention relates to a stirring tool for a kitchen appliance such as a food processor. More particularly, the present invention relates to a stirring tool for stirring food to be heated or cooled by the appliance in a bowl.

BACKGROUND

This section provides background information related to the present disclosure which is not necessarily prior art.

Food processors are known which consist of an enclosure with a base that is heated by either induction or a resistive element. The enclosure also houses a driveshaft that can be used to drive an interchangeable tool in a rotary motion. Different tools are available to provide different functions; for example whisking, chopping etc. Also a processor may be arranged to cool ingredients in a bowl.

A commonly used tool is one which stirs ingredients that are being heated within the enclosure. When heat or cooling is applied to the enclosure in order to cook or cool the ingredients it is desirable to generate motion amongst the ingredients in order to distribute the heat or coolness evenly and ensure uniform cooking or cooling. Current methods of providing this stirring use a stirring tool with a flat blade which is driven around the enclosure in a circular motion. This design of stir tool is generally effective at preventing ingredients from burning or freezing and sticking to the base of the enclosure.

These flat bladed stirring tools have the disadvantage of doing very little to turn over ingredients that are formed of larger "chunks", such as diced meat products and sliced/diced vegetables. Instead of being turned over, or even moved around the bowl, these types of ingredients are simply lifted away from the heated/cooled surface momentarily as the stirring blade passes underneath it. These types of tool are also very ineffective at stirring larger volumes of ingredients, for example in soups or stews, as they only have an influence over the ingredients in the region close to the base of the enclosure. This means that there may be a large temperature gradient between ingredients at the base of the enclosure compared with ingredients higher up the volume in the enclosure, resulting in uneven cooking or cooling of the ingredients.

The present invention seeks to alleviate these problems.

SUMMARY

This section provides a general summary of the disclosure, and is not a comprehensive disclosure of its full scope or all of its features.

According to the present invention, there is provided a stirring tool for stirring food in a bowl of a kitchen appliance, the tool comprising a shaft adapted to be driven in rotation by a drive outlet of the kitchen appliance about a drive axis of the shaft, and a blade extending outwardly of the shaft at or adjacent a base thereof, the blade being shaped so as to lift food from a leading edge to a trailing edge thereof upon rotation of the blade, and the leading edge being shaped so as to urge food inwardly towards the shaft.

Thus the food impinging on the leading edge of the blade moves up the blade and falls off the trailing edge, causing the food to turn over. The food is urged inwardly to counteract centrifugal force which tends to push the food outwardly, such that it does not accumulate at the periphery of the bowl.

For example, the leading edge of the blade may have a curved profile, at least an outer part of the blade being curved inwardly for urging food inwardly of the bowl. The blade may also be angled upwardly from the leading edge to the trailing edge thereof, such that food moves up and over the blade.

The angle of inclination may vary along the length of the blade, for example decreasing in the outward direction from the shaft. The blade may also have a width that decreases in the outward direction away from the shaft.

Optionally, the blade has a curved trailing edge, which may terminate in a scraper having an axially extending end face or scraper which extends concentrically of the shaft.

By providing a scraper at the end of the blade, ingredients that may have been pushed outwards by the centrifugal force generated by the blade when rotating at high speeds are lifted away from the base and edge of the bowl.

Optionally, the end face is arranged to be closely adjacent an inner peripheral surface of the bowl in use so as to scrape ingredients away from the edge of the bowl.

Optionally, the shaft carries a secondary blade, the secondary blade being substantially upright and being shaped so as to push food downwardly. The second blade can be provided for the purpose of pushing ingredients downwards towards the base of the bowl. This can lead to more uniform mixing of the ingredients by the stirring tool. Additionally, if the bowl is heated, the blade assists in ensuring a uniform heating of the ingredients in the bowl.

Optionally, the secondary blade is substantially helical in relation to the shaft, such that it provides a downwardly angled lower face.

Optionally, the width of the blade decreases from the top to the bottom of the shaft, such that the distance by which the secondary blade extends from the central shaft decreases from the top to the bottom of the secondary blade. The shaft may also be wider at the bottom than at the top. This assists in preventing a food wedge from forming, in which ingredients are trapped at the bottom of the secondary blade and therefore not properly mixed, from forming.

Optionally, the maximum height of the secondary blade is arranged to be above a maximum fill level of the bowl in use, so that ingredients initially lying at all heights within the bowl will be pushed downwards. This helps to ensure a more uniform mixing of ingredients, and is especially beneficial when some ingredients may float to the surface of a liquid mixture. Optionally, the maximum radius of the secondary blade is arranged to coincide substantially with an inner radius of the bowl in use.

Optionally, a finger grip is provided at the top of the shaft to facilitate easier removal and insertion of the stirring tool into the kitchen appliance.

Optionally, the finger grip is arranged to extend above a maximum fill level of the bowl in use so that it will not become immersed in the ingredients when the tool is in use, and will not therefore become slippery, which would make the tool harder to remove after use.

The stirring tool may be a removable tool for use in stirring food and/or liquids in a kitchen appliance, such as a food processor, a bread maker, an ice cream maker a fryer or a slow cooker. The tool may for example be manufactured from heat resistant plastic, metal or rubber.

The shaft may comprise an internal aperture for receiving a drive shaft of the appliance, and a passage communicating with the aperture for allowing the escape of any gas such as steam that might build up between the tool and the drive shaft.

Another aspect of the invention provides a kitchen appliance having a bowl and a stirring tool as defined above.

The drive outlet may comprise a drive shaft having a substantially helical flank, in which the angle between the face of the flank and the drive shaft tapers along the length of the flank, for example from the top to the bottom of the flank so as to grip internal threads on the tool increasingly more tightly as it is fitted onto the drive shaft or if the tool moves upwardly.

Thus in another aspect, the invention provides a kitchen appliance comprising a bowl for containing food, a processing tool, and a drive shaft for operative connection to the tool, wherein the tool has an aperture for receiving the drive shaft, and the drive shaft has a substantially helically extending drive flank having a drive face extending outwardly from a surface the drive shaft, in which the angle between the drive face of the flank and the surface of the drive shaft preferably decreases from a lower region to an upper region of the flank, the tool having an engagement formation for engaging against the flank.

The engagement formation may comprise a corresponding helical thread provided in a bore or aperture of the tool for engaging with the flank, or may simply comprise a protrusion for abutting the flank.

The helical flank acts to pull the tool downwardly towards the base of the bowl when the tool is placed over the drive shaft and as the drive shaft rotates. Preferably the tool comprises at least one processing element such as a blade which is arranged to sit closely adjacent the base of the bowl when the tool is fully seated on the drive shaft.

The drive shaft preferably comprises a pair of such helical flanks, with the tool comprising a corresponding pair of engagement formations. Moreover the tightening of the angle between the drive face of the flank and the surface of the drive shaft tends to grip the engagement formations of the tool more tightly should the tool move upwardly, thus tending to retain the tool fully engaged on the drive shaft.

Furthermore, the drive shaft may comprise an opposing helical flank, or a pair of such opposing flanks, which turn(s) in the opposite direction. The engagement formation of the tool may engage against the opposing flank when the shaft rotates in the opposing direction. Thus the tool may operate in either direction. This feature may be provided with or without the feature of the drive face angle being tapering.

Preferably the base of each flank faces the base of an opposing flank, such that each engagement formation on the tool, such as a protrusion, may move between them when the direction of rotation is reversed. The drive shaft may have an abutment member provided between the flank and the opposing flank near the base thereof to reduce movement of the protrusion, and thus free play of the tool, in use.

The invention also comprises a drive shaft for driving a food processing tool as defined above. Of course, it is possible that the same effect may be achieved by providing the helical driving flank(s) on the inside of the tool, and the protrusions on the drive shaft, and the invention also encompasses a kitchen appliance having such a configuration.

Thus according to another aspect, the invention comprises a drive arrangement for a food processor tool comprising a driveshaft and a tool having an aperture for receiving the driveshaft, the arrangement being such that the tool receives rotational drive from the drive shaft when seated thereon, at least one of the drive shaft and the tool having a drive flank comprising a drive face extending outwardly from a surface thereof, at least a driving part of the drive flank extending substantially helically, and in which the other of the driveshaft and the tool has at least one engagement formation for engaging against the flank, and in which either the angle between the drive face of the flank and the surface of the drive shaft is tapering.

The invention also provides a drive arrangement as defined above, comprising a pair of drive flanks, in which the helical parts of the drive flanks turn in opposite directions in order to drive the tool in either direction.

Furthermore the invention is not restricted to the case where the tool sits over the drive shaft; clearly it would also be possible for the drive shaft to have an aperture into which an element of the tool fits, with the drive flank(s) and the engagement formation(s) being provided on either axially extending surface, ie an outer surface of the tool and/or an inner surface of the drive shaft.

The invention may also provide a kitchen appliance comprising a bowl for containing food, a processing tool, and a drive shaft for operative connection to the tool, wherein the tool has an aperture for receiving the drive shaft, and the drive shaft has a substantially helical flank, in which the angle between the face of the flank and the drive shaft tapers from the top to the bottom of the flank, the tool having a corresponding helical thread for engaging with the flank.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Embodiments of the present invention will now be described, by way of example only and with reference to the accompanying drawings having like-reference numerals, in which:

FIG. 1 illustrates a perspective view of a stirring tool;
FIG. 2 illustrates a front view of the stirring tool;
FIG. 3 illustrates a rear view of the stirring tool;
FIG. 4 illustrates a view from one side of the stirring tool;
FIG. 5 illustrates an a view from the other side of the stirring tool;
FIG. 6 illustrates a top view of the stirring tool;
FIG. 7 illustrates a bottom view of the stirring tool;
FIG. 8 illustrates the stirring tool in a kitchen appliance bowl;
FIG. 9 illustrates an example of a driveshaft used to drive the stirring tool;
FIGS. 10a and 10b show horizontal cross sections through another example of a driveshaft; and
FIG. 11 is a perspective view of an alternative stirring tool,
FIG. 12 is a perspective view of an alternative drive shaft;
FIG. 13 is a cross-sectional side view of a tool for use with the drive shaft of FIG. 12;

DETAILED DESCRIPTION

Figure 1:
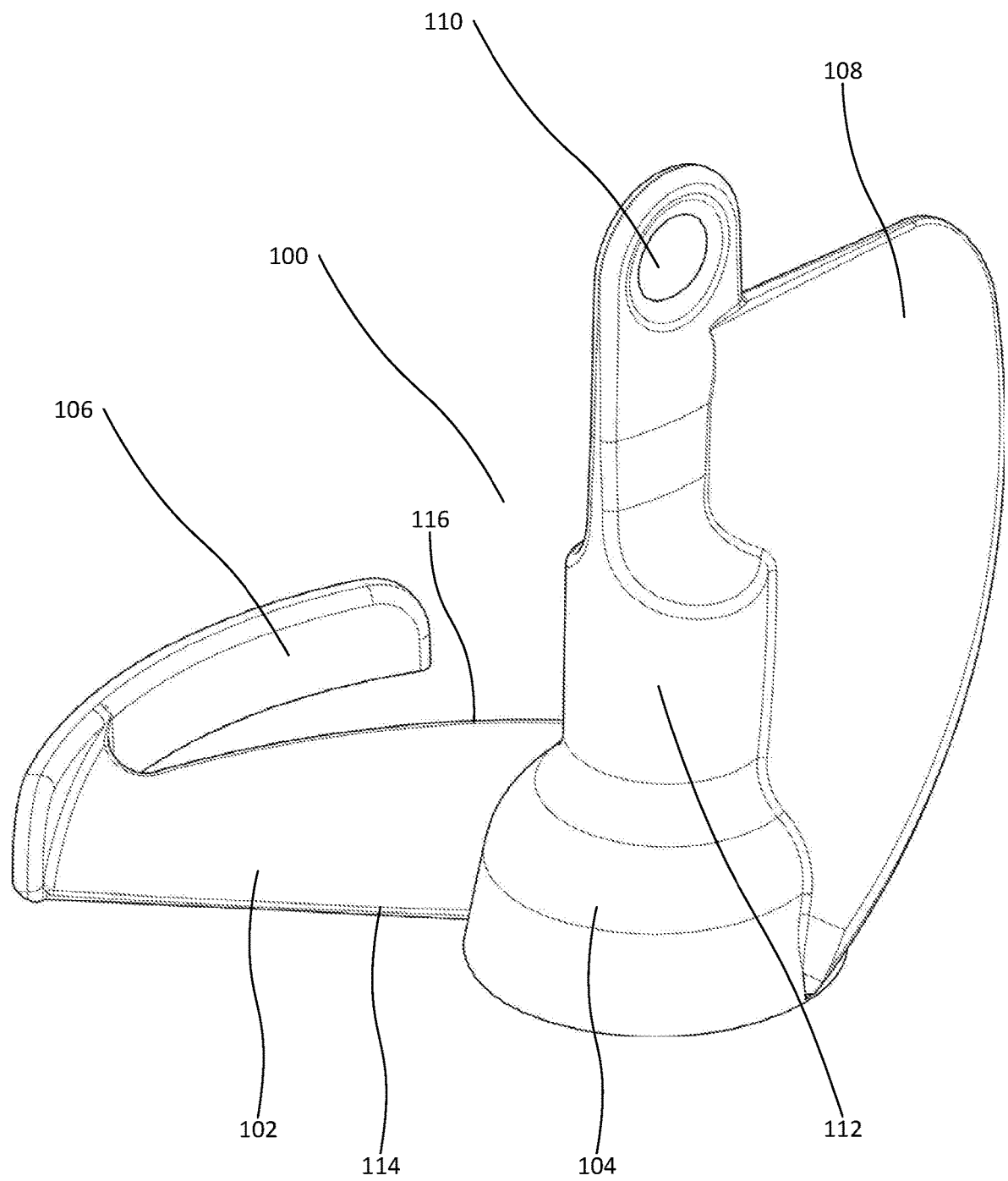
Figure 2:
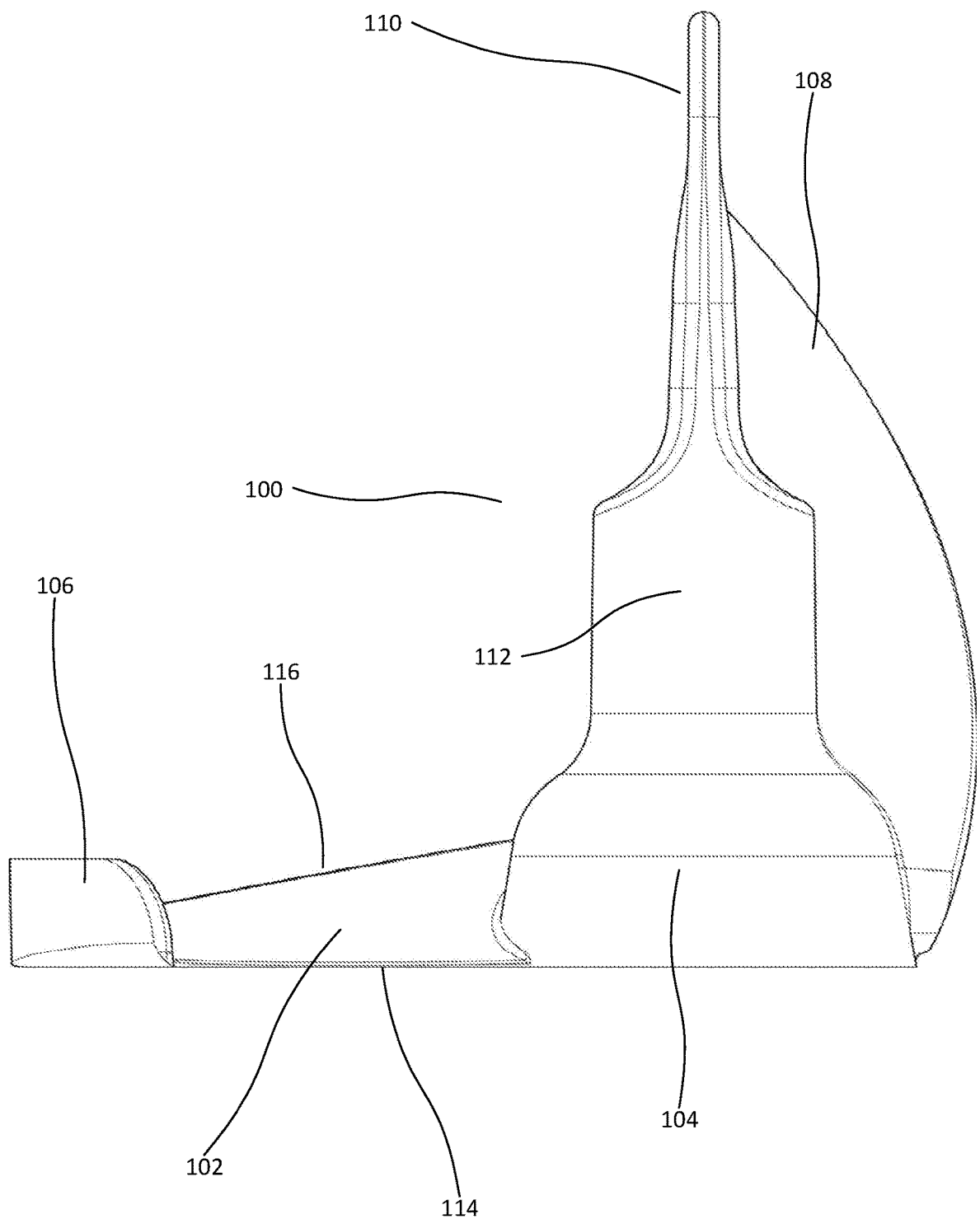
Figure 3:
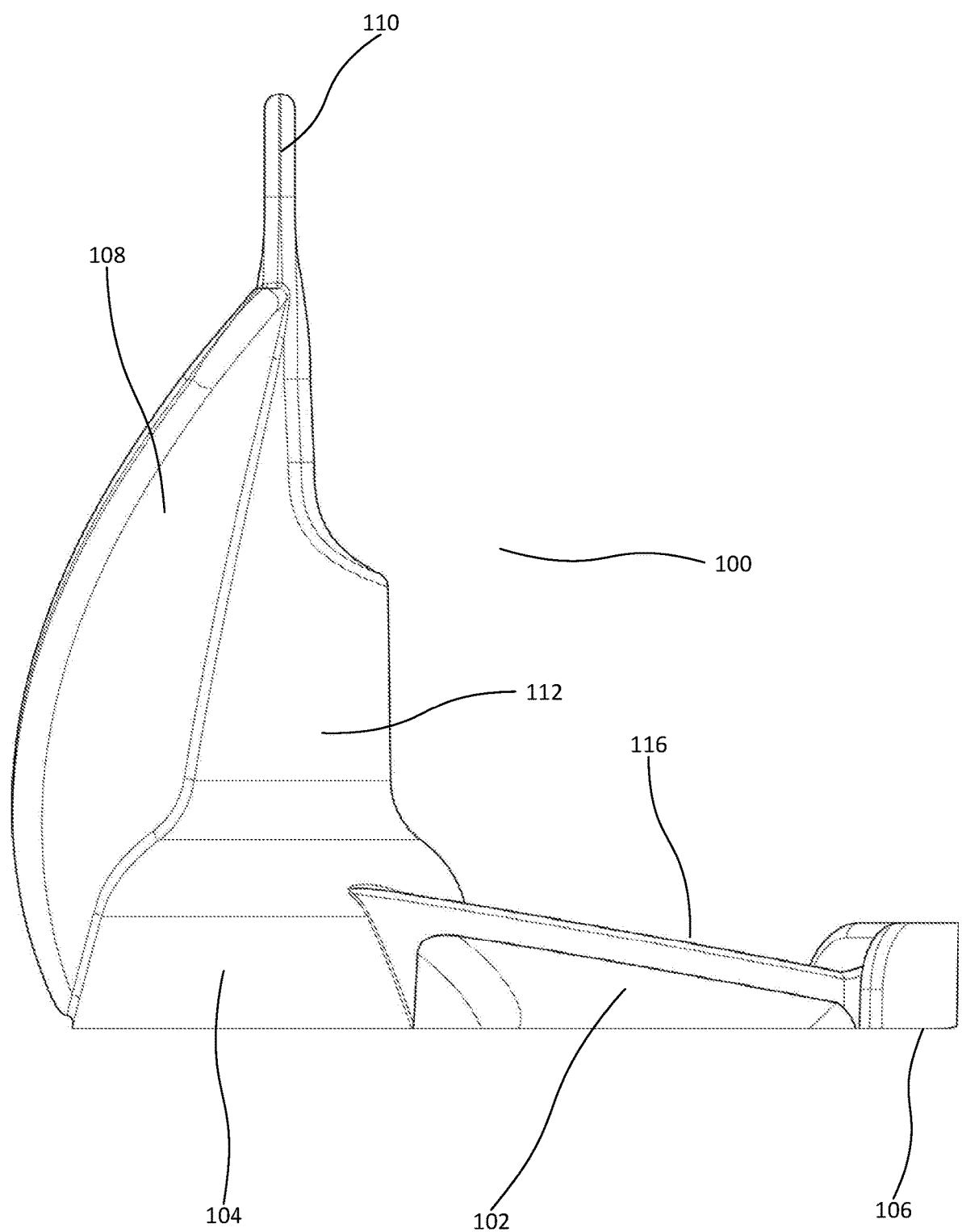
Figure 4:
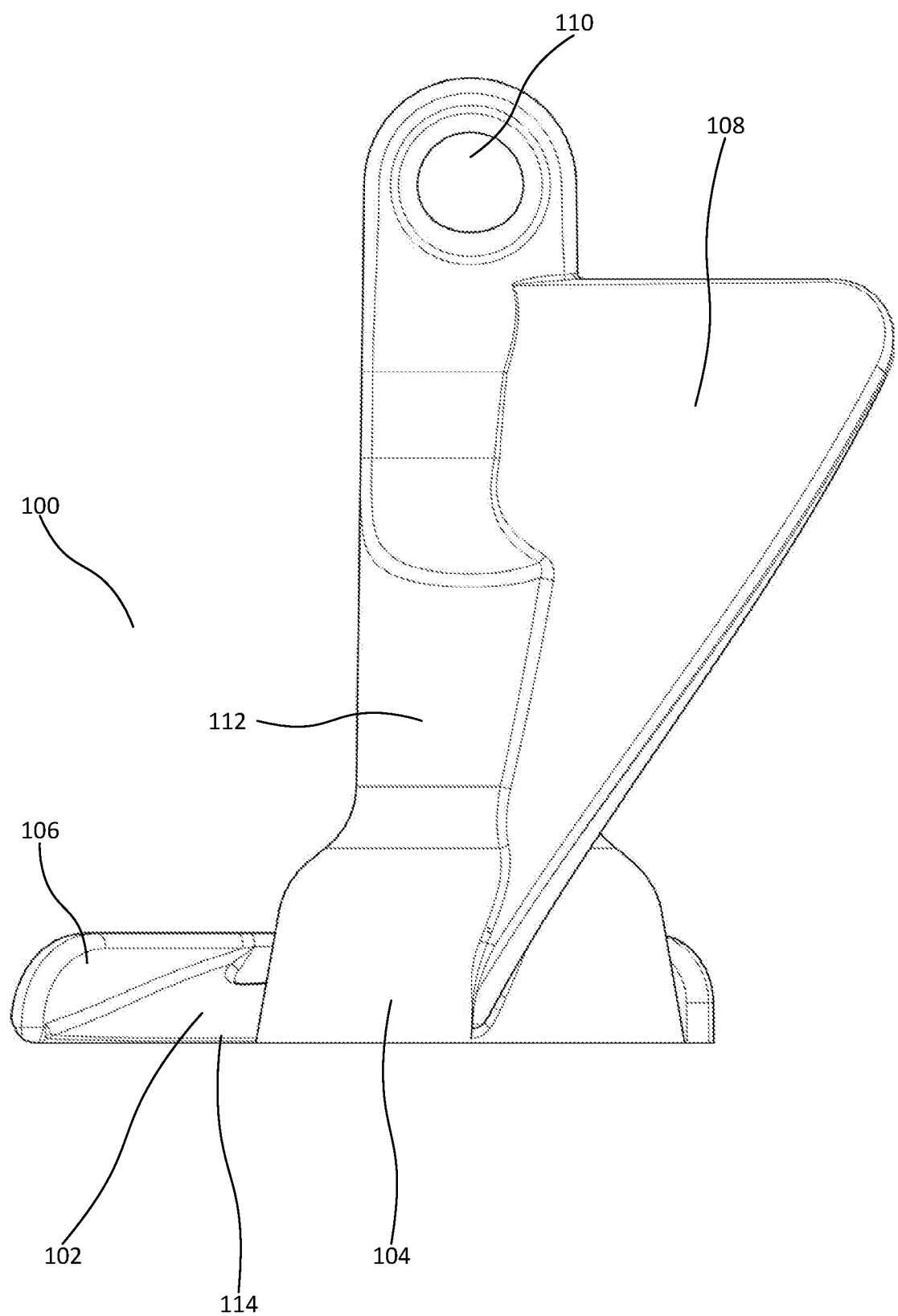
Figure 5:
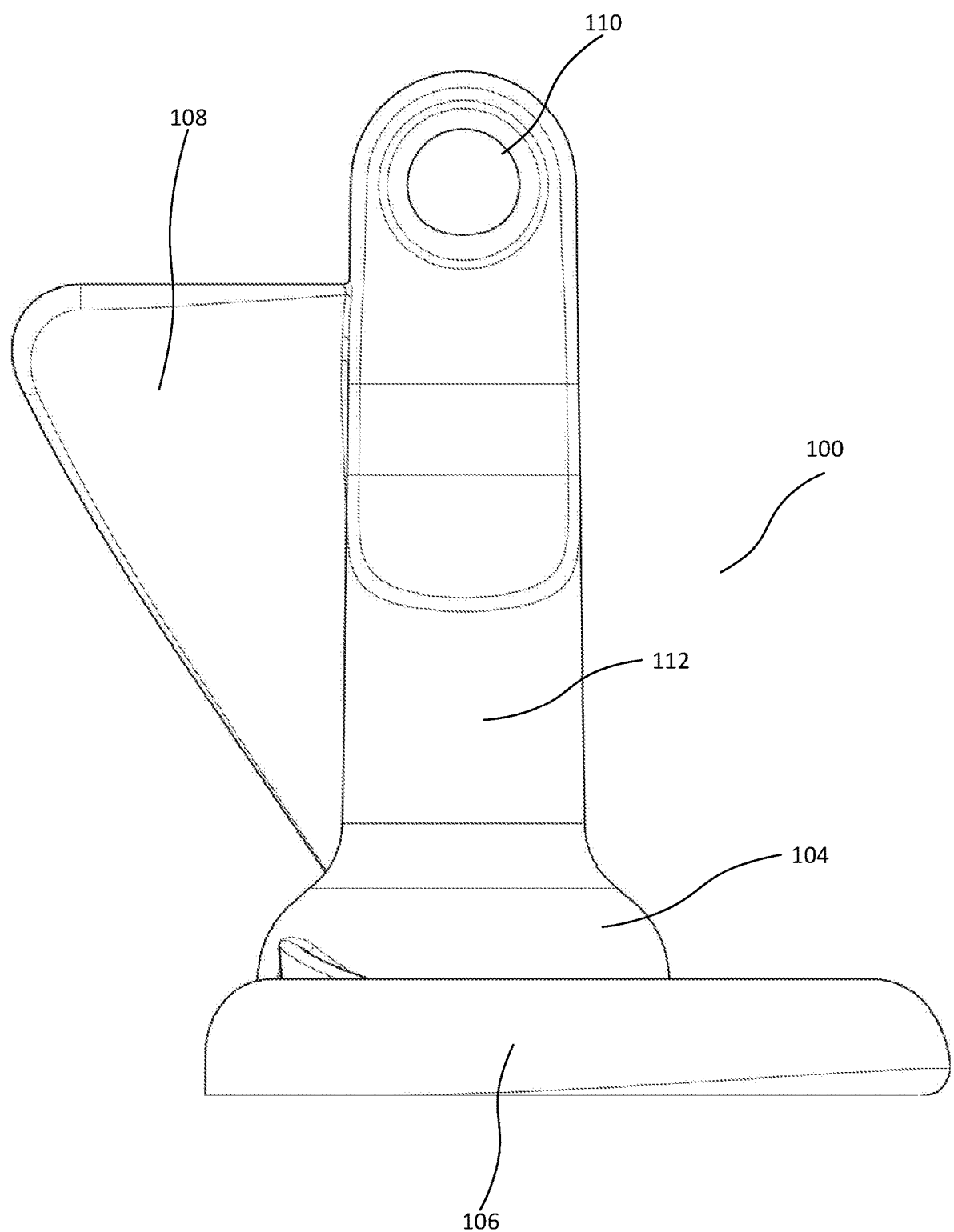
Figure 6:
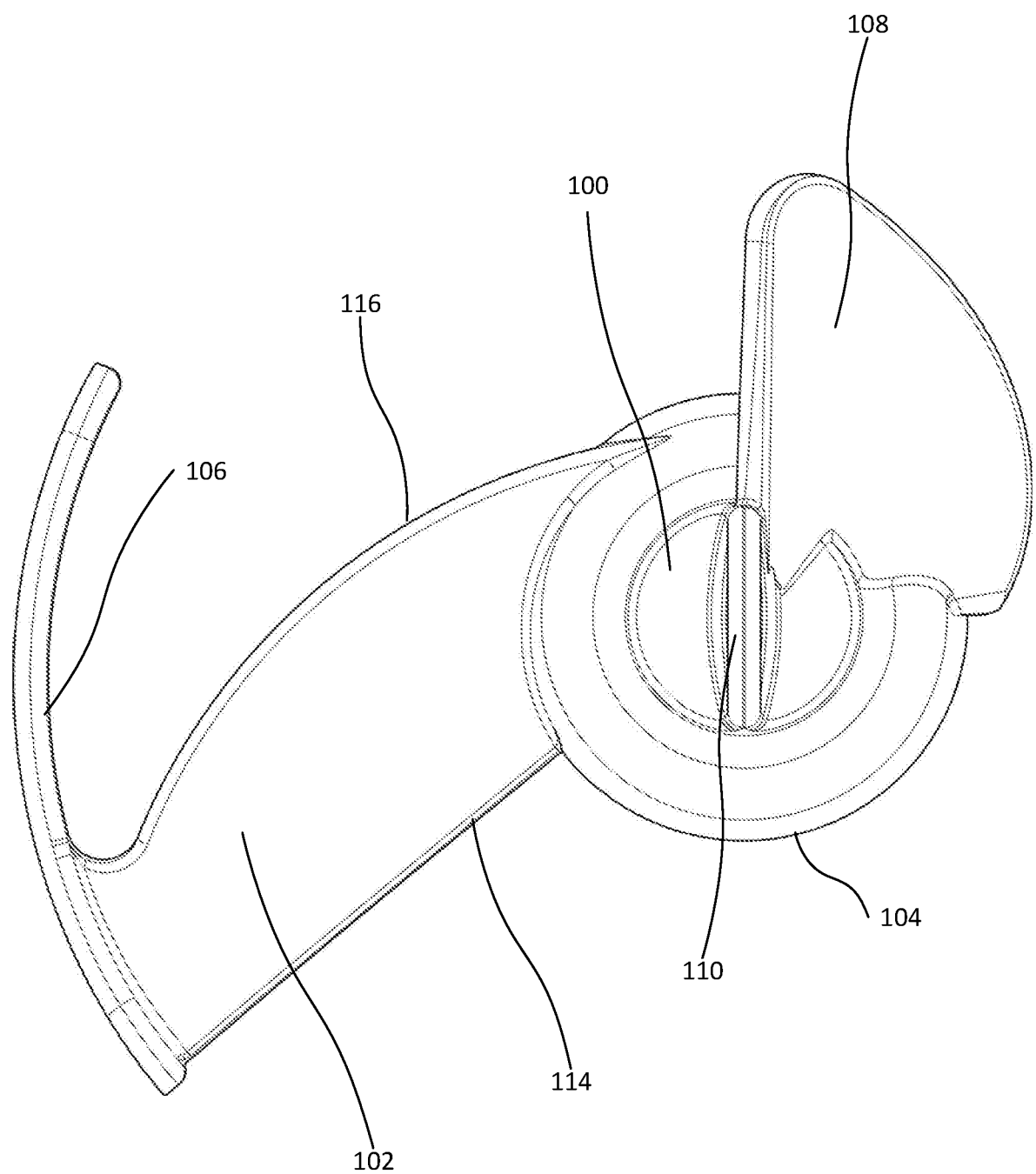

Example embodiments will now be described more fully with reference to the accompanying drawings.

A stirring tool comprises an elongate central shaft 100 for engaging the tool with a driveshaft of the kitchen appliance in order for it to be driven in rotational motion when in use. The tool is driven by this driveshaft around an enclosure of the kitchen appliance, such as a food processor bowl, into which ingredients may be added and stirred by the tool. A curved, inclined blade 102 extends outwardly from the base of the elongate central shaft 104 that acts to stir the ingredients. The curved blade terminates in a scraper 104 at its furthermost edge from the elongate central shaft 100. A secondary, helical blade 106 is provided that extends substantially radially from the elongate central shaft 100 and is elongate in the direction of the shaft. A finger grip 108 is positioned at the top of the elongate central shaft 100 to facilitate simple insertion and removal of the tool from the food processor.

The central shaft 100 comprises a base 104 through which a driveshaft in the kitchen appliance can be detachably engaged and from which the curved blade 102 extends, a middle section 112 with a narrower radius than the base which engages with the driveshaft of the kitchen appliance, and a narrow upper part which includes a finger grip 110 to aid a user in the insertion or removal of the tool. The height of the central shaft 100 is such that when the tool is attached to the kitchen appliance, it extends above a maximum fill level of the enclosure of the kitchen appliance containing the ingredients being mixed.

The curved blade 102 comprises a leading edge 114 that extends from the base of the central shaft 104. The leading edge 114 may be straight or have a substantially concave curvature. The leading edge 114 should be close enough to the height of the base of the central shaft 104 that, when the tool is in use, it is closely adjacent the base of the bowl and acts to prevent ingredients from passing under the curved blade 102. If the driveshaft outlet to which the tool is attached is raised relative to the base of the kitchen appliance for which the tool is designed for, the blade 102 may also additionally descend from the base of the tool 104.

A curved trailing edge 116 extends from a raised point on the edge of the base of the central shaft 104. It has a convex curvature. The height of the trailing edge 116 decreases from a maximum at the base of the central shaft 104 to a minimum at the distal end of the trailing edge from the central shaft.

Between the leading 114 and trailing 116 edges of the blade 102 extends a blade face. The blade face is upwardly inclined relative to the direction of motion of the tool when in use. In the embodiment shown in the figure, the angle of inclination of the blade face decreases in the outward direction from the central shaft 100, though it may alternatively remain constant or even increase. The width of the blade face, as defined by the distance from the leading edge 102 to the trailing edge 116 of the blade 102 generally decreases in the outward direction from the central shaft 100.

The blade 102 preferably extends a distance approximating to the inner radius of the enclosure of the kitchen appliance around which it is driven in order to stir substantially all the ingredients located at the base of the kitchen appliance. The blade 102 extends from the central shaft 100 along an offset radial direction.

A scraper 106 is provided at the end of the blade that extends substantially circumferentially and axially from the back of the blade 102. The scraper is profiled to lift ingredients near the edge of the kitchen appliance enclosure away from the base of the enclosure and off the edge face of the enclosure.

Figure 7:
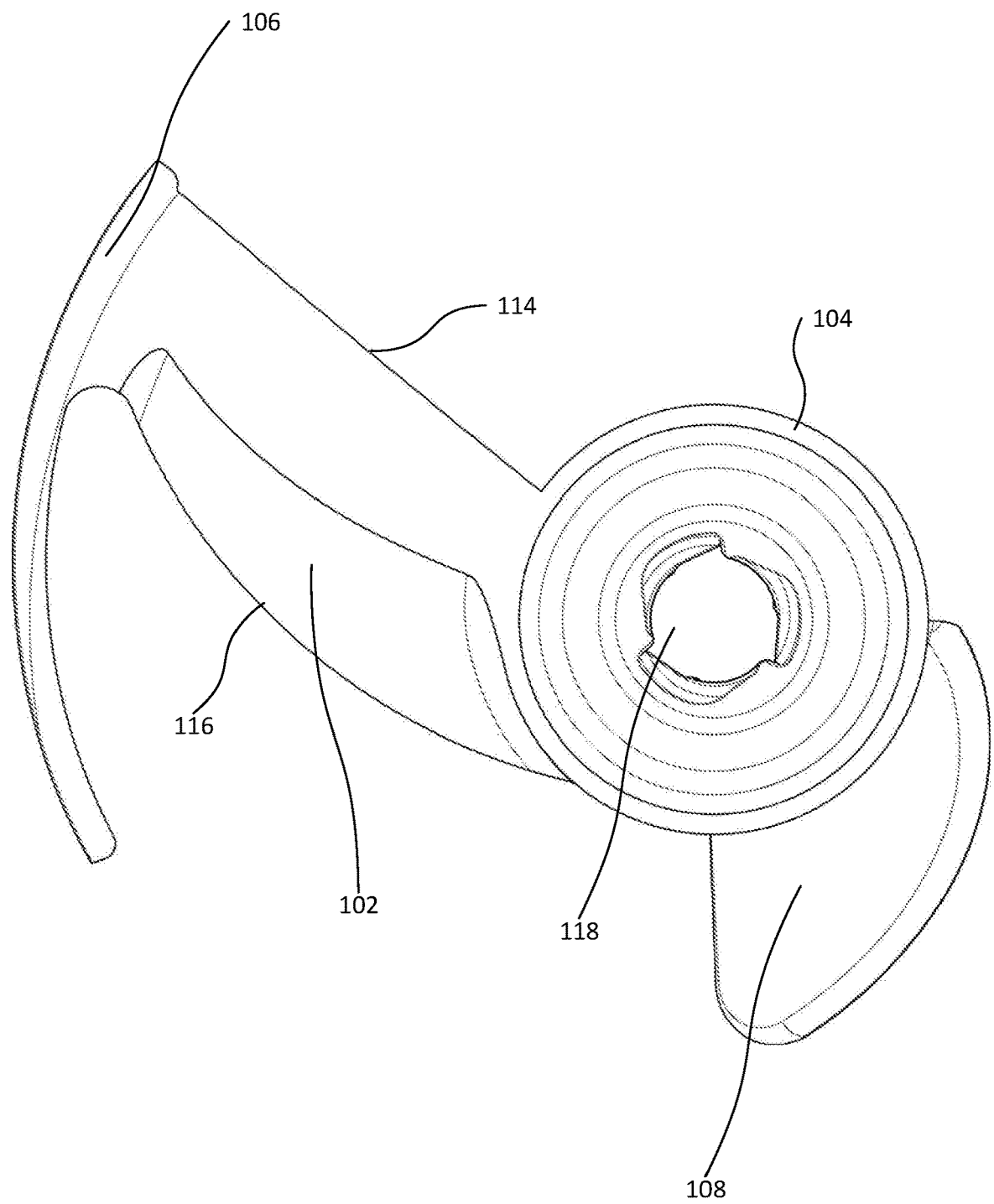

FIG. 7 shows a bottom view of the stirring tool. A central hole 118 in the base of the central shaft 104 is provided with helical threads or other attaching means for engaging the central shaft of the stirring tool with a drive outlet of a kitchen appliance.

Figure 8:
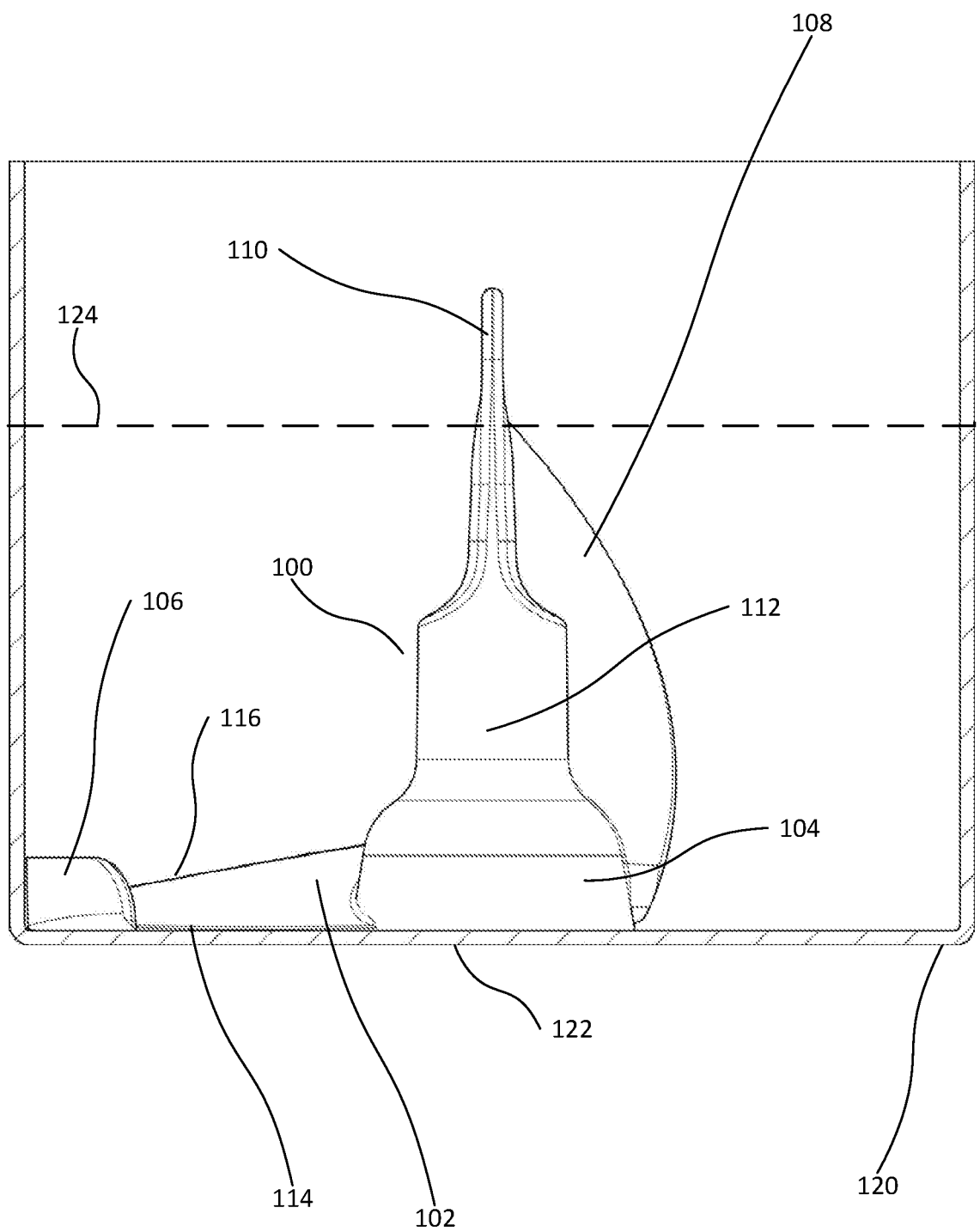

FIG. 8 shows the stirring tool in a kitchen appliance bowl. In use, the curved blade 102 is driven in rotational motion around the base of the kitchen appliance enclosure 122 about an axis extending longitudinally along the central shaft 100. The angled face of the curved blade 102 that is presented to the ingredients is angled such that when the tool is driven in a circular motion inside a food processor bowl 120, ingredients in the food processor bowl 120 are pushed around the bowl. Ingredients within the food processor bowl 120 are collected on the curved blade 102 as it rotates within the bowl 120 until a mass of ingredients builds up on the curved blade 102 to the point that they slide up over the leading edge 114 of the curved blade 102 and roll back down over the trailing edge 116 of the curved blade 102 and onto the base the kitchen appliance enclosure 122, thus turning over and mixing the food.

At slower speeds the curved profile of the curved blade 102 reacts against the centrifugal force generated by the rotary motion of the tool and prevents ingredients from moving radially and collecting at the perimeter of the enclosure. This is due to the curvature and inclination of the blade 102 providing a force on the ingredients within the kitchen appliance bowl 120 when in rotational motion that has an inwardly directed component, towards the central shaft 100.

At higher speeds the curvature of the curved blade 102 is unable to overcome the centrifugal forces applied to the ingredients and some ingredients may move towards the perimeter of the bowl 120. The scraper 106 at the end of the curved blade is profiled such that it lifts any ingredients up from the base of the bowl at the perimeter.

The secondary, helical blade 108 extends outwardly and substantially radially from the central shaft 100 on substantially the opposite side of the central shaft to the curved blade 102. It is elongate in the direction of the central shaft 100, extending from near the top of the central shaft to at or near the base 104 of the central shaft 100. The secondary blade 108 is inclined in a forward direction relative to the direction of the rotational motion of the tool. The radius to which the secondary blade 108 extends varies along the length of the central shaft 100, being at its minimum near the base of the secondary blade and at its maximum near the highest point of the secondary blade.

The minimum radius to which the secondary blade 108 extends, as measured from the edge of the base of the central shaft 104, is preferably less than 10 mm, and more preferably about 3 mm. The maximum radius of the secondary blade 108 is preferably approximately the internal radius of the kitchen appliance bowl 120 in which the tool is used, or less.

The secondary, helical blade 108 also acts to stir ingredients when the tool is in use. The chirality or inclination of the helix is such that when the tool is being driven the secondary, helical blade 108 acts to force ingredients downwards towards the base of the food processor bowl. The height of the secondary, helical blade 108 is such that the upper edge is higher than the maximum fill level 124 of the kitchen appliance bowl 120. This ensures that ingredients near the top of the bowl 120, for example those that float in a liquid inside the enclosure or are added to the enclosure during use, are incorporated or blended into the mixture being stirred by the tool. It also has the secondary benefit of preventing ingredients being pushed upwards and causing undue pressure against the top of the kitchen appliance enclosure 120 when the tool is being driven at high speeds.

The variable radius of the secondary blade 108, being greater at the top of the secondary blade 108 than the bottom, provides a surface capable of stirring a large volume of ingredients, while also avoiding having a wedge shaped "food trap" at the base of the enclosure. This aims to prevent ingredients becoming trapped at the base of the secondary blade 108. Large chunks of food ingredients, such as pieces of meat, which become trapped in this location could potentially become broken down, degrading the texture of the mixture being prepared in the enclosure.

The finger grip 110 extends above the maximum fill level 124 of the kitchen appliance enclosure 120 to facilitate easier removal of the stirring tool.

The upwardly-facing blade face of the curved blade 102 generates a downwards force acting on the tool as it passes through the working medium, but in contrast the downwardly-facing face of the secondary blade 108 generates an upwards force as it passes through the working medium. The curved blade 102 and the secondary blade 108 should therefore preferably sized, shaped, angled, or otherwise configured so that the downward force on the tool along the central shaft 100 resulting from the interaction of the curved blade 102 with the working medium is at least equal to, and preferably greater than the upwards force resulting from the interaction of the secondary blade 108 with the working medium, even when the food processor bowl 120 is filled to the top of the secondary blade 108. This helps ensure that the net force acting on tool along the central shaft 100 during operation does not push upwards, and preferably presses downwards, thus aiding attachment of the tool to the driveshaft.

Figure 9:
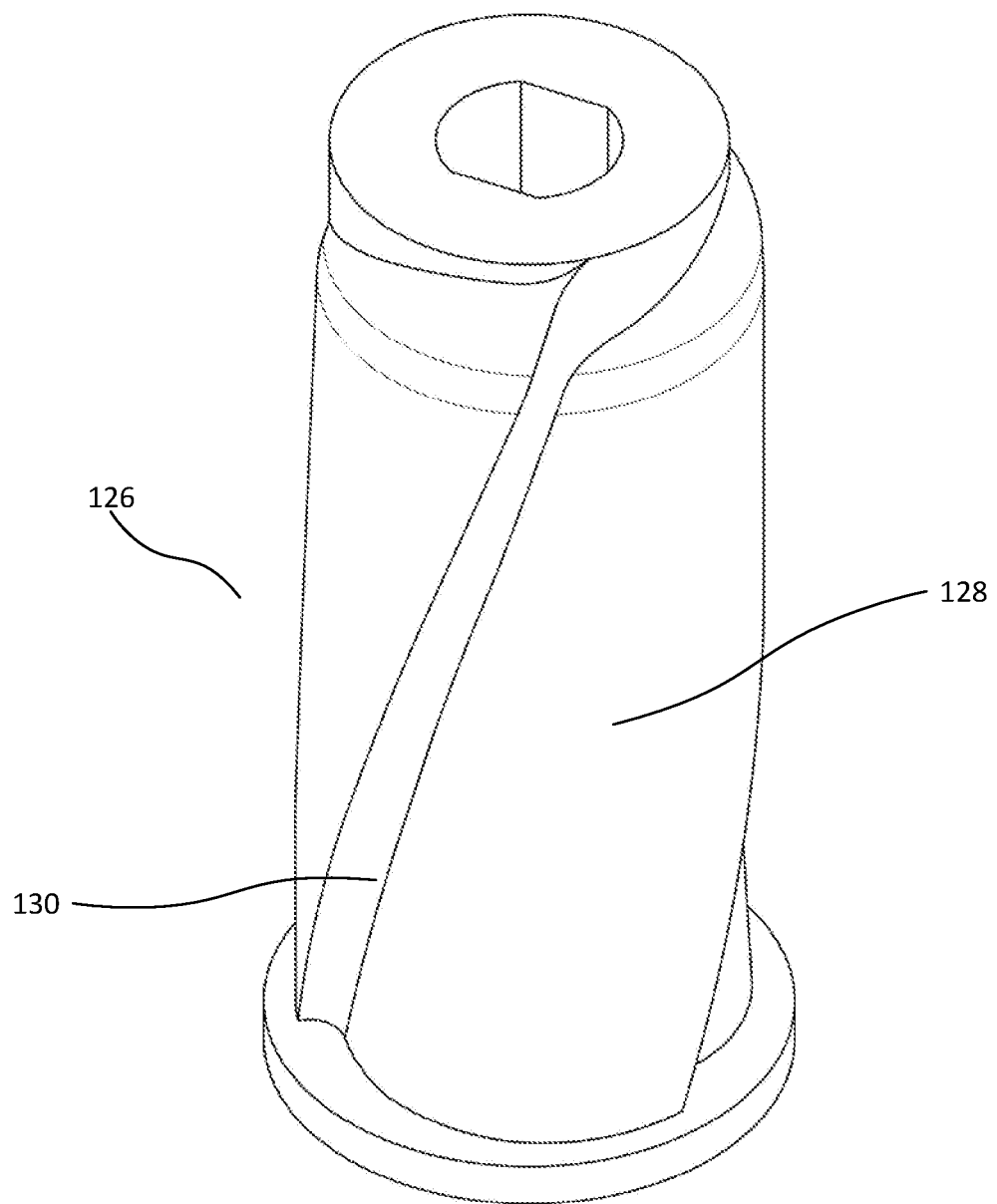

FIG. 9 shows an example of a driveshaft used to drive the stirring tool. The tool is driven by a driveshaft 126 extending upwards into the kitchen appliance bowl or enclosure from the base of the kitchen appliance. The driveshaft comprises helical driving flanks 128. The direction of the helix is such that as long as the tool is partially engaged onto the driveshaft the helix will act to pull the tool downward to the base of the enclosure as it reacts against the rotary motion of the driveshaft.

The non-driven (i.e., facing away from the direction of rotation) side of the helix 130 on the driveshaft 126 is completely tapered at a shallow angle. This has the benefit of preventing the tool from jumping upwards towards the top of the enclosure if the rotary motion is stopped abruptly, for example if motor breaking is applied.

Figure 10:
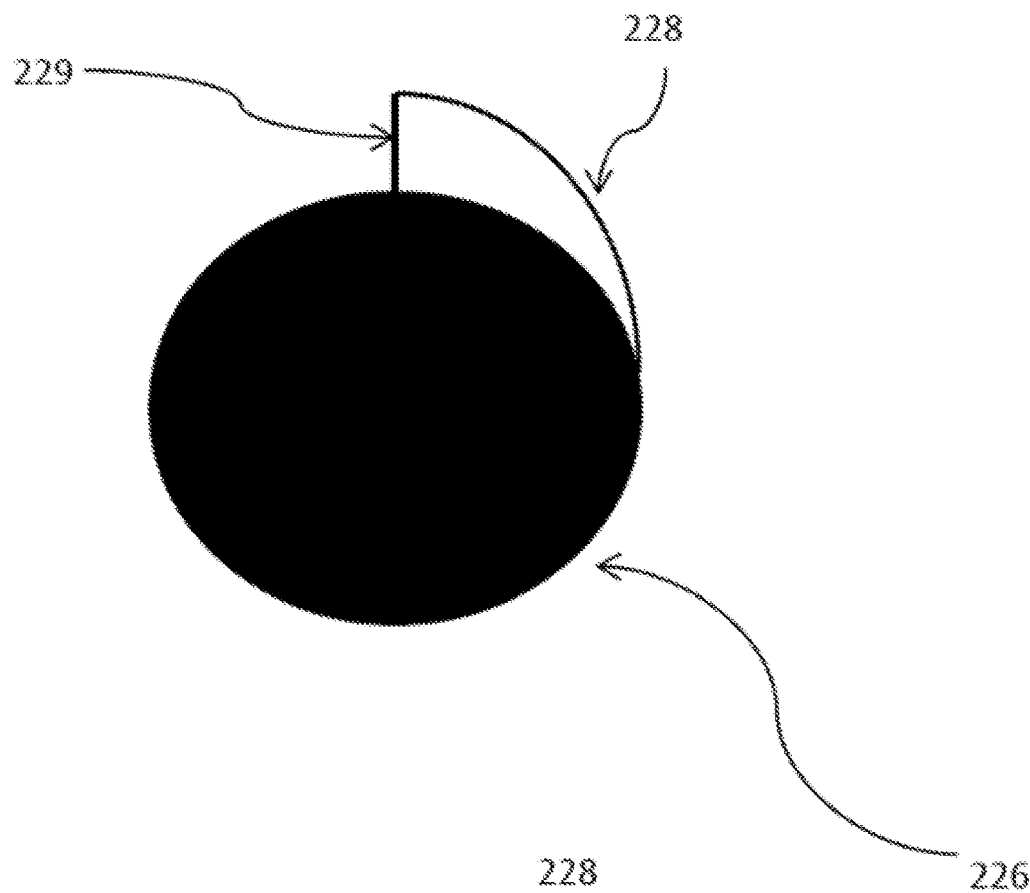
Figure 10:
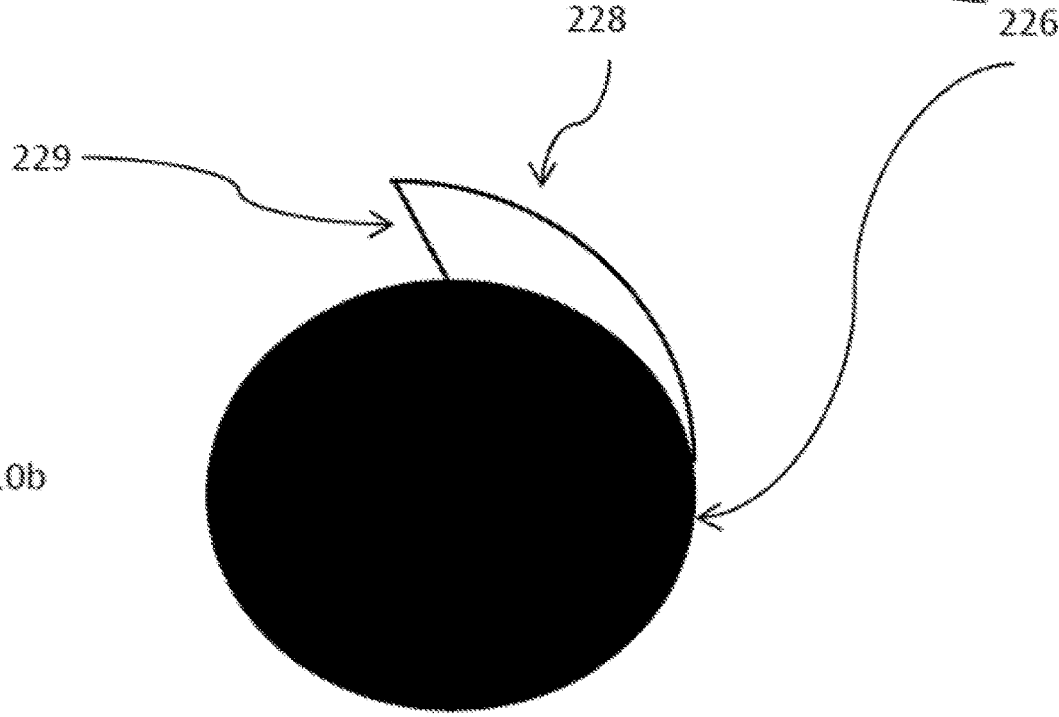

FIGS. 10a and 10b show horizontal sections through an example driveshaft 226 similar to the driveshaft 126. A helical driving flank 228 is formed on the driveshaft 226. For simplicity's sake only one helical driving flank 228 is shown, however more than one helical driving flank 228 may be formed on the face of the driveshaft 226. The helical driving flank 228 has a forward face 229 that engages with a matching thread on the inside of the central hole 118 of the tool. The forward face 229 extends radially outwards from the driveshaft 226 and faces in the direction of rotation.

As shown FIG. 10a, which shows a horizontal section through the driveshaft 226 near the top of the driveshaft 226, towards the top of the driveshaft 226 the forward face 229 extends substantially at a right angle from the face of the driveshaft 226. Whilst a right-angle is shown here, the angle may be any oblique angle.

However, as shown in FIG. 10b showing a horizontal section through the driveshaft 226 near the bottom of the driveshaft 226, towards the bottom of the driveshaft 226 the angle between the forward face 229 of the helical driving flank 228 and the face of the driveshaft 226 decreases so that the forward face 229 of the helical driving flank 228 opposes the face of the driveshaft 226. This has the effect that, as the threads on the inside of the central hole 118 slide down the driveshaft 226 during attachment, the threads are increasingly "pinched" between the forward face 229 of the helical driving flank 228 and the face of the driveshaft 226 as the angle between them reduces, ensuring a firmer attachment of the tool to the driveshaft 226. The driveshaft 226 may be formed of a relatively (i.e., compared to steel) resilient polymer to enhance this gripping/pinching effect.

Figure 11:
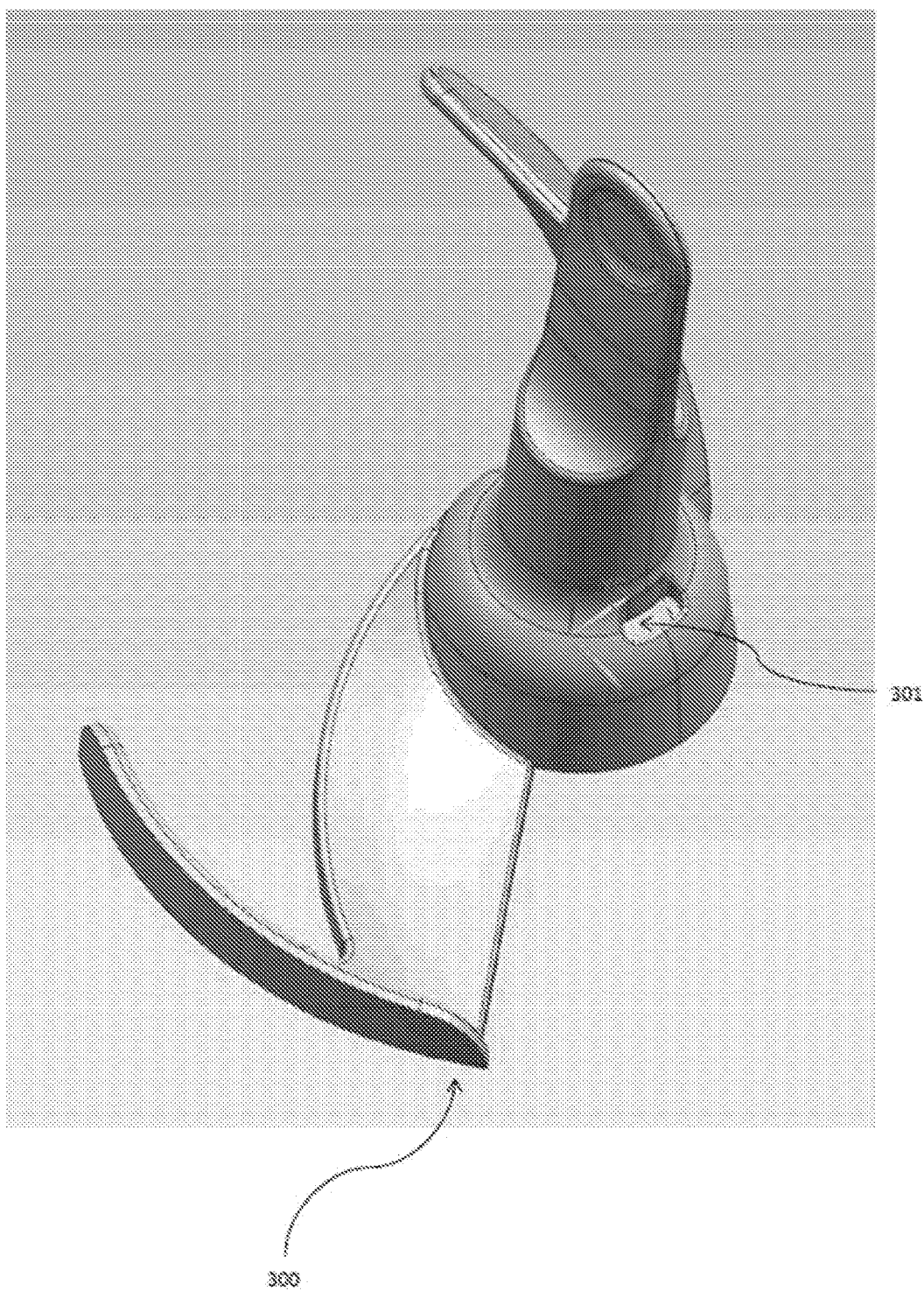

FIG. 11 shows an alternate tool 300 similar to the tool 100, in which a hole 301 is formed in the hub of the tool 300 to allow the escape of gases such as, for example, steam-bubbles that might otherwise collect between the interior of the tool 300 and the driveshaft to which it is attached (not shown), causing it to potentially float away when immersed during cooking. A valve or filter (not shown) may be formed in the hole 301 to prevent ingress of working medium into the hub of the tool 300 through the hole 301 whilst still permitting the escape of steam or other gases.

Figure 12:
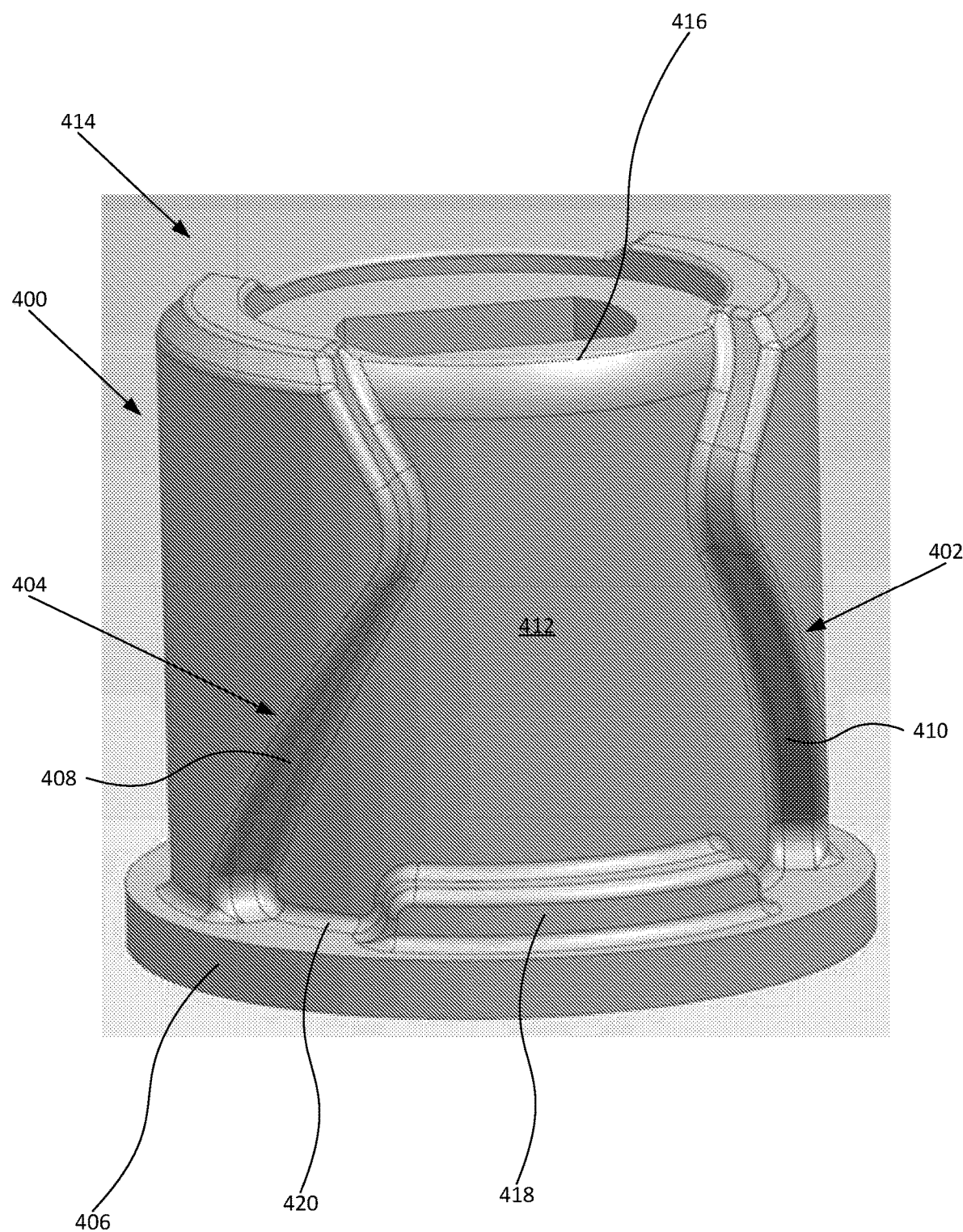

Referring now to FIGS. 12 to 16, an alternative driveshaft 400 is shown. The driveshaft 400 has two pairs of helical flanks. As can be seen in FIG. 12, each pair comprises a clock-wise drive flank 402 and a counter-clockwise drive flank 404 each extending from a position adjacent a base 406 of the driveshaft and which face each other. Between the pair of flanks 402, 404 is a recessed surface 412 of the driveshaft. The other pair of drive flanks is located diametrically opposite the pair 402,404 shown in the drawing.

Each of the flanks 402, 404 forms a drive face 408, 410 which extends outwardly from the surface 412 of the driveshaft. The drive faces 408, 410 form an angle with the driveshaft which is larger towards the base 406, and tightens progressively upwardly.

Towards an upper end 414 of the driveshaft, the flanks 402, 404 are each chamfered towards the opposite helical direction, so that they open away from each other, to leave an opening 416. The drive faces each form a smooth curve between the helical drive section and the chamfered section. Between the flanks 402, 404 at the base 406 of the driveshaft, an elongate abutment member 418 is provided extending along the base to form a step separated from the bottom of each flank by a space 420. The ends of the drive faces 402, 404 and the ends and corners of the abutment 418 are rounded.

Figure 13:
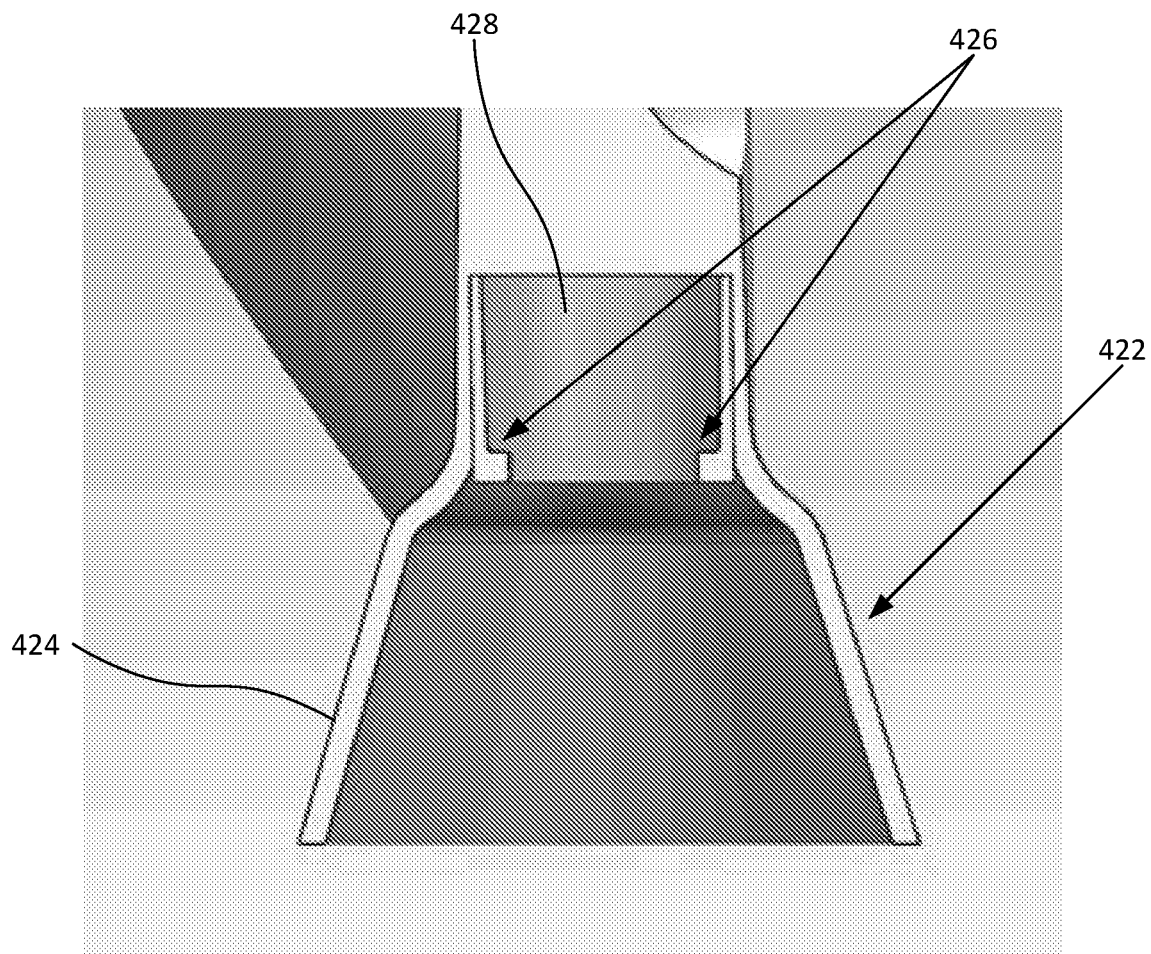
Figure 14:
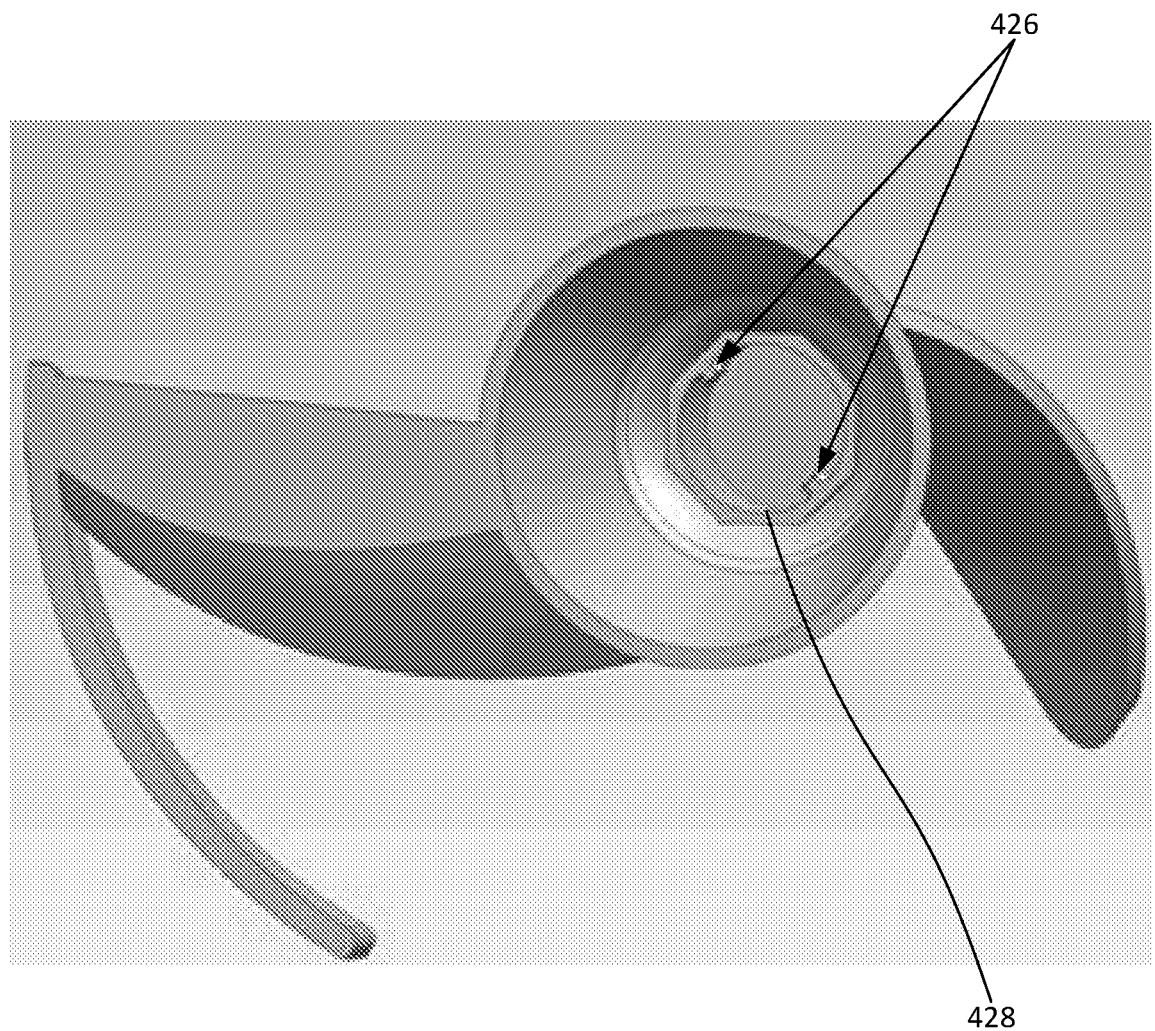
FIG. 14 is an underneath view of the tool of FIG. 13.
Figure 15:
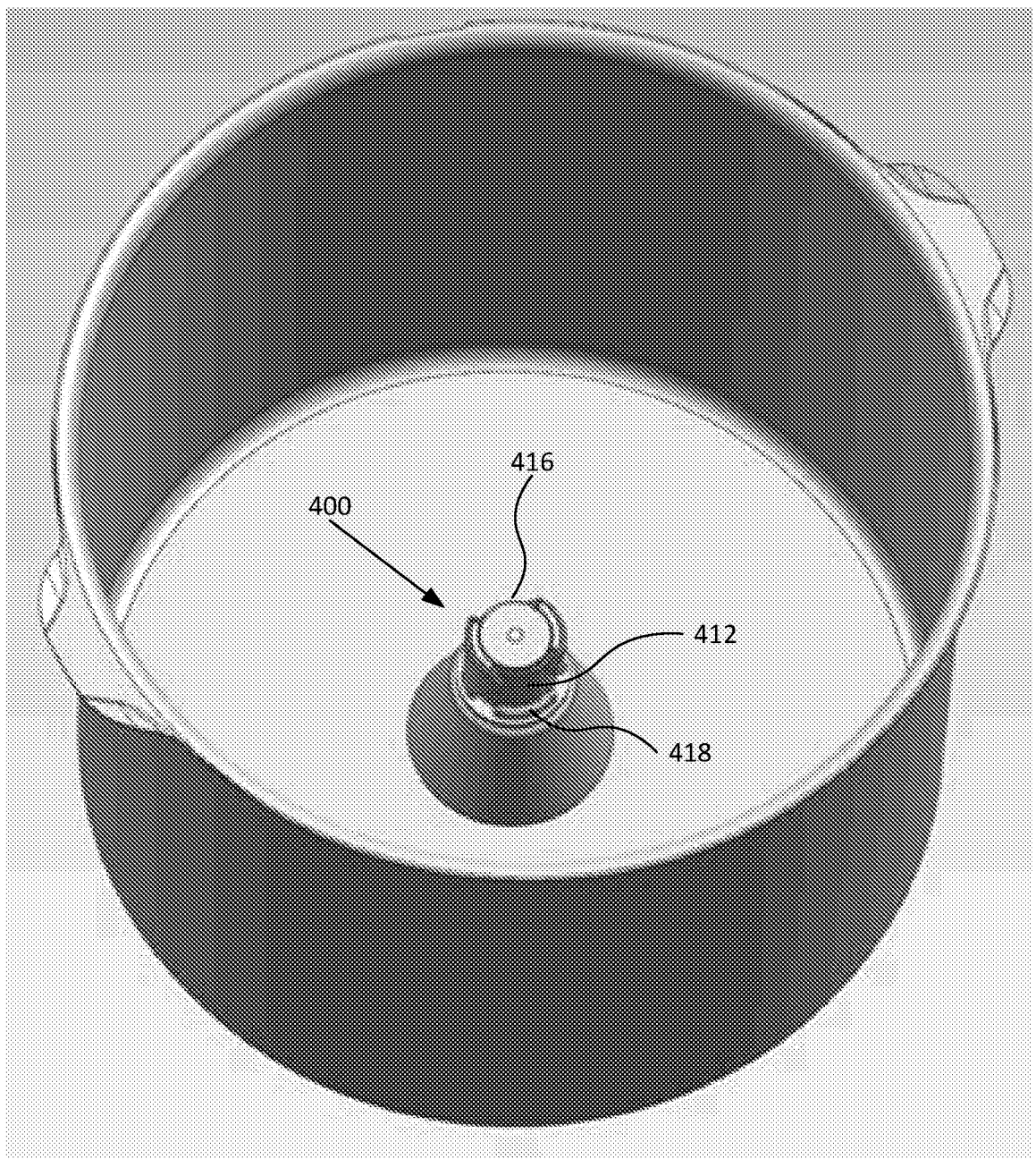
FIG. 15 is a perspective view of a bowl containing the drive shaft of FIG. 12.

Referring now to FIGS. 13 and 14, an alternative tool 422 for use with the driveshaft 400 shown in FIG. 12 is similar to the tool of FIGS. 1 to 8. However the base part 424, which is substantially frustoconical in shape, has an internal bore containing a pair of opposed protrusions 426 extending radially inwardly from a substantially circular collar 428 within the bore.

Figure 16:
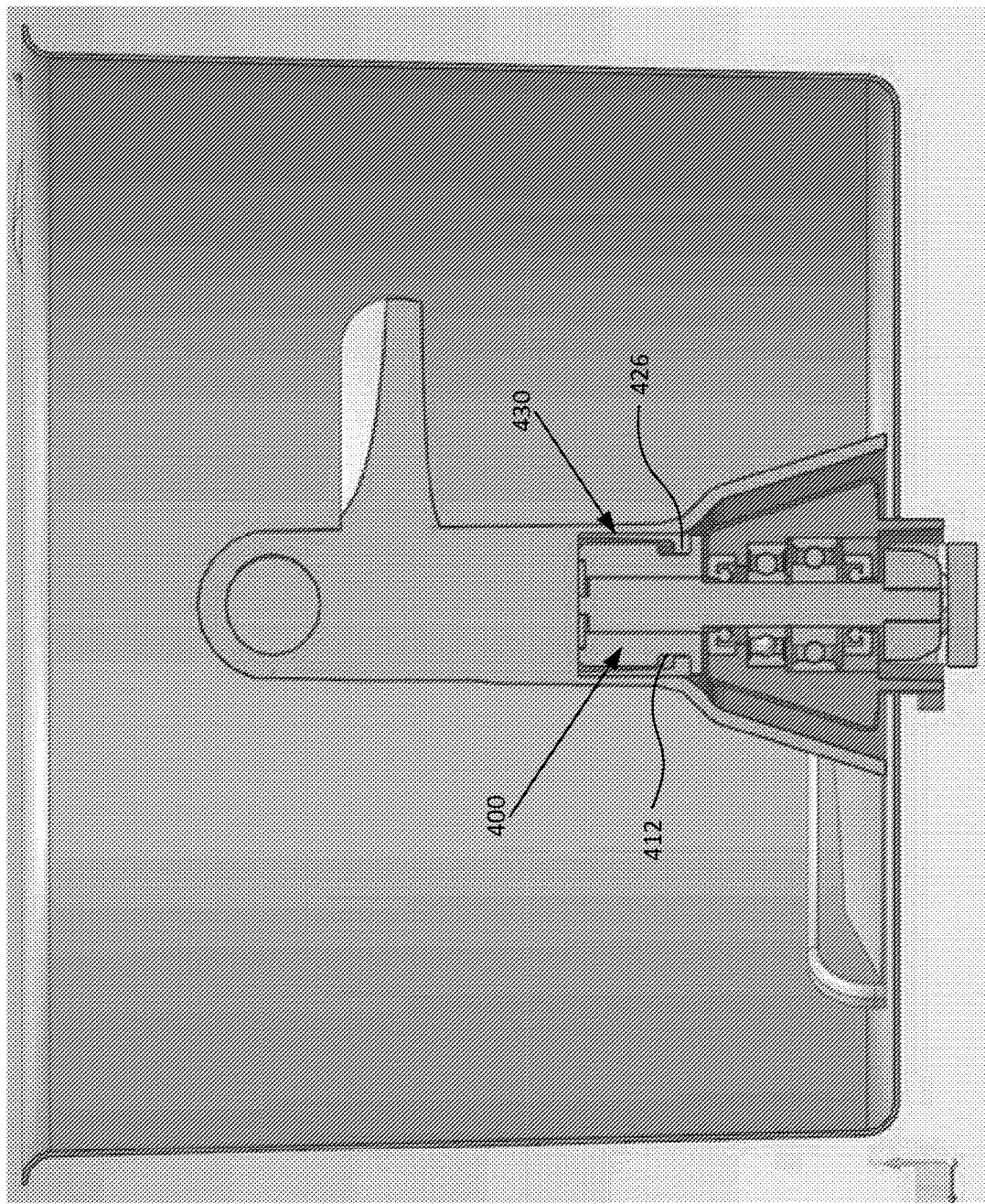
FIG. 16 is a cross-sectional side view of the tool fitted to the drive shaft.

As can be seen from FIG. 16, the bore in the tool 422 is sized and shaped such that an upper cylindrical part 430 fits closely over the driveshaft 400. The protrusions 426 are sized to each extend inwardly towards the opposed recessed surfaces 412 of the driveshaft 400 such that they each fit between a pair of drive flanks.

In use, when the user wishes to attach the tool 422 to the driveshaft 400, the tool 422 is placed over the driveshaft 400 with the bore aligned therewith. The opening 416 allows the protrusions 426 to be aligned easily to enter between each pair of flanks. The protrusions then seat in the spaces 420 between the base of a flank 402, 404 and the adjacent edge of the abutment step 418.

As the driveshaft rotates in the counter-clockwise direction, each protrusion bears against a corresponding counter-clockwise drive face 408 of the flank 402 such that the tool is driven to rotate with the driveshaft 400. Should the tool tend to rise up, the protrusion 426 will ride up along the drive face 408. Since the angle of the drive face 408 becomes progressively more acute, the protrusion 426 will tend to be gripped between the face 408 and the recessed surface 412 such that further upward movement is inhibited. Thus the tool 422 is retained seated on the driveshaft.

Furthermore, the abutment step 418 prevents excessive circumferential movement of the protrusion 426 away from the drive face 408. Upon rotation of the driveshaft 400 in the clockwise direction, the protrusion 426 moves towards the opposite drive flank 402, and seats in the respective space 420 against the face 410 for driving the tool 422 in the opposite direction.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

Whilst the invention(s) has been described in the field of domestic food processing and preparation machines, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances.

The invention(s) described here may be used in any kitchen appliance and/or as a standalone device. This includes any domestic food-processing and/or preparation machine, including both top-driven machines (e.g., stand-mixers, with the tool being driven from the top by a downwardly-depending driveshaft) and bottom-driven machines (e.g., food processors). It may be implemented in heated and/or cooled machines. The invention may also be implemented in both hand-held (e.g., a hand blender, where the tool may be attached to the drive outlet either from the top or from the bottom) and table-top (e.g., blenders) machines. It may be used in a machine that is built-in to a work-top or work surface, or in a stand-alone device. The invention can also be implemented as a stand-alone device, whether motor-driven or manually powered.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A stirring tool for stirring food in a bowl of a kitchen appliance, the tool comprising:
a shaft adapted to be driven in rotation by a drive outlet of the kitchen appliance about a drive axis of the shaft;
a blade extending outwardly of the shaft at or adjacent a base thereof, the blade being shaped along a blade length thereof so as to lift food from a leading edge to a trailing edge thereof upon rotation of the blade, and the leading edge being shaped along a leading edge length thereof so as to urge food inwardly towards the shaft, and
wherein the blade terminates in a scraper having an axially extending end face which extends concentrically of the shaft, wherein the end face is arranged to be closely adjacent an inner peripheral surface of the bowl in use.

2. The stirring tool as claimed in claim 1, wherein the leading edge of the blade has a curved profile.

3. The stirring tool a claimed in claim 1, wherein the blade is angled upwardly from the leading edge to the trailing edge thereof, and wherein the angle of inclination varies along the blade length of the blade, wherein the angle of inclination decreases in the outward direction from the shaft.

4. The stirring tool as claimed in claim 1, wherein the blade has a width that decreases in the outward direction away from the shaft, and/or wherein the blade has a curved trailing edge.

5. The stirring tool as claimed in claim 1, wherein the shaft carries a secondary blade, the secondary blade being substantially upright and being shaped so as to push food downwardly, wherein the secondary blade is substantially helical in relation to the shaft.

6. The stirring tool as claimed in claim 5, wherein the distance by which the secondary blade extends from the central shaft decreases from the top to the bottom of the secondary blade.

7. The stirring tool as claimed in claim 5, wherein the maximum height of the secondary blade is arranged to be above a maximum fill level of the bowl in use, and/or wherein the maximum radius of the secondary blade is arranged to coincide substantially with an inner radius of the bowl in use.

8. The stirring tool as claimed in claim 1, wherein a finger grip is provided at the top of the shaft, wherein the finger grip is arranged to extend above a maximum fill level of the bowl in use.

9. The stirring tool as claimed in claim 1, wherein the shaft comprises an internal aperture for receiving a drive shaft of the appliance, and a passage communicating with the aperture for allowing the escape of gas.

* * * * *